United States Patent [19]

VanName

[11] Patent Number: 5,060,470

[45] Date of Patent: Oct. 29, 1991

[54] GAS GENERATOR VENTABLE AT A HIGH TEMPERATURE FOR HAZARD REDUCTION

[75] Inventor: Frederick W. VanName, Newark, Del.

[73] Assignee: Thiokol Corporation, Ogden, Utah

[21] Appl. No.: 526,884

[22] Filed: May 22, 1990

[51] Int. Cl.$^5$ .......................... F02K 9/34; F02K 9/38
[52] U.S. Cl. ....................................... 60/253; 60/255; 428/902; 428/285; 102/481
[58] Field of Search .................. 60/253, 255; 102/481, 102/287, 289; 428/902, 285, 36.1, 36.4

[56] References Cited

U.S. PATENT DOCUMENTS 4,458,482  7/1984  Vetter et al. .......................... 60/253
4,911,795  3/1990  Oliff ....................................... 60/253

Primary Examiner—Louis J. Casaregola
Assistant Examiner—Laleh Jalali
Attorney, Agent, or Firm—James C. Simmons; Ronald L. Lyons

[57] ABSTRACT

A rocket motor or other gas generator the case of which is ventable at a predetermined temperature substantially greater than the ambient temperature range for storage and operation thereof and substantially less than the auto-ignition temperature of gas generant material contained therein so as to prevent catastrophic propulsion or burst in case of fire. The venting is provided by memory metal members which are interleaved between plies of matrix-impregnated fibrous material in the case and which have a transformation temperature which is substantially higher than the ambient temperature range and substantially lower than the auto-ignition temperature and characterized by a change in shape when heated to a temperature above the transformation temperature.

4 Claims, 1 Drawing Sheet

GAS GENERATOR VENTABLE AT A HIGH TEMPERATURE FOR HAZARD REDUCTION

The present invention relates generally to rocket motors and other gas generators. More particularly, the present invention relates to gas generators which have composite cases, i.e., cases which are composed of a fibrous material which is impregnated with a resin or other matrix material.

The burning of a propellant material within the case produces gases which are controllably released through a nozzle to produce thrust for propelling a rocket motor. The propellant material is ignited for such use by an igniter system. However, each type of propellant material has an auto-ignition temperature, that is, a temperature at which the propellant will automatically ignite. The propellant material for a particular rocket motor is thus selected to have an auto-ignition temperature which is substantially greater than the ambient temperature range for storage of the rocket motor prior to its use. If, due to an unexpected fire near a stored rocket motor, the propellant material in the rocket motor becomes so hot that it auto-ignites, not only may the fire hazard become increased but the rocket motor may become propulsive thus magnitudinally increasing the catastrophic damage which may occur. While such a danger of propulsion may not be prevalent with other kinds of gas generators, it would still be desired to prevent catastrophic burst hazards from a high build up of pressure within a gas generator.

A large amount of energy is uneconomically required to sever the strands of fibrous material in a rocket motor case by a shape charge or the like.

It is therefore an object of the present invention to provide a composite case for a rocket motor or other gas generator which is ventable at a temperature which is above the ambient temperature range for storage thereof but which is lower than the auto-ignition temperature of gas generant therein so as to prevent catastrophic propulsion or burst of the case.

It is another object of the present invention to vent the case in a manner which is reliable and economical.

In order to provide such a ventable gas generator, in accordance with the present invention a plurality of memory metal members are interleaved with the plies of fibrous material of the case, the memory metal members characterized by having a transformation temperature which is substantially higher than the ambient temperature range and which is substantially lower than the auto-ignition temperature of the gas generant material wherein the memory metal members are characterized by a change in shape such as by straightening to create breaks or vents in the case when heated to a temperature above the transformation temperature.

Other objects, features, and advantages of the present invention will become apparent in the following detailed description of the preferred embodiments thereof which should be read in connection with the accompanying drawings.

DETAILED DESCRIPTION OF THE PREFERRED EMBODIMENTS

Figure 1:
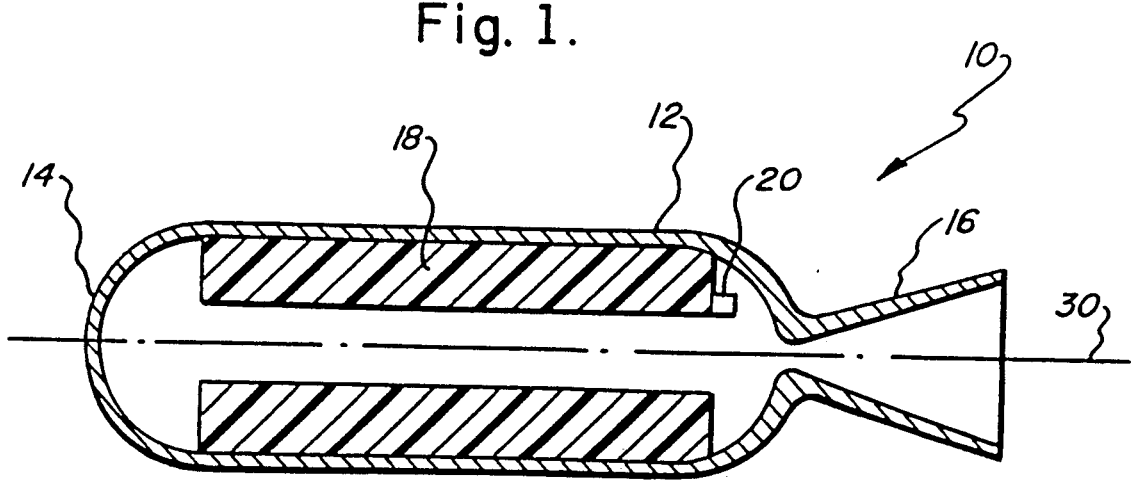
FIG. 1 is a generally schematic longitudinal section view of a rocket motor which embodies the present invention.

Referring to FIG. 1, there is illustrated generally at 10 a rocket motor which includes an elongate generally cylindrical case 12. A domed member 14 closes the forward end of the case 12, and the aft end is connected to a nozzle assembly 16 which may be of the convering-diverging type conventionally found in rocket motors. Contained with the case 12 is a suitable solid propellant material 18 which may be attached to the inside wall of the case 12 with a suitable liner (not shown) and insulation material (not shown) interposed between the propellant material 18 and the case 12. While the propellant material 18 may be of any suitable type, an example thereof may be found in U.S. Pat. No. 4,764,319 to Hightower, Jr. et al which is assigned to the assignee of the present invention and which patent is hereby incorporated herein by reference. For operation, the propellant material 18 may be ignited by a suitable conventional igniter illustrated schematically at 20 to rapidly produce gases which pass through the narrow throat of the nozzle 16 creating thrust for propulsion of the rocket motor.

Figure 2:
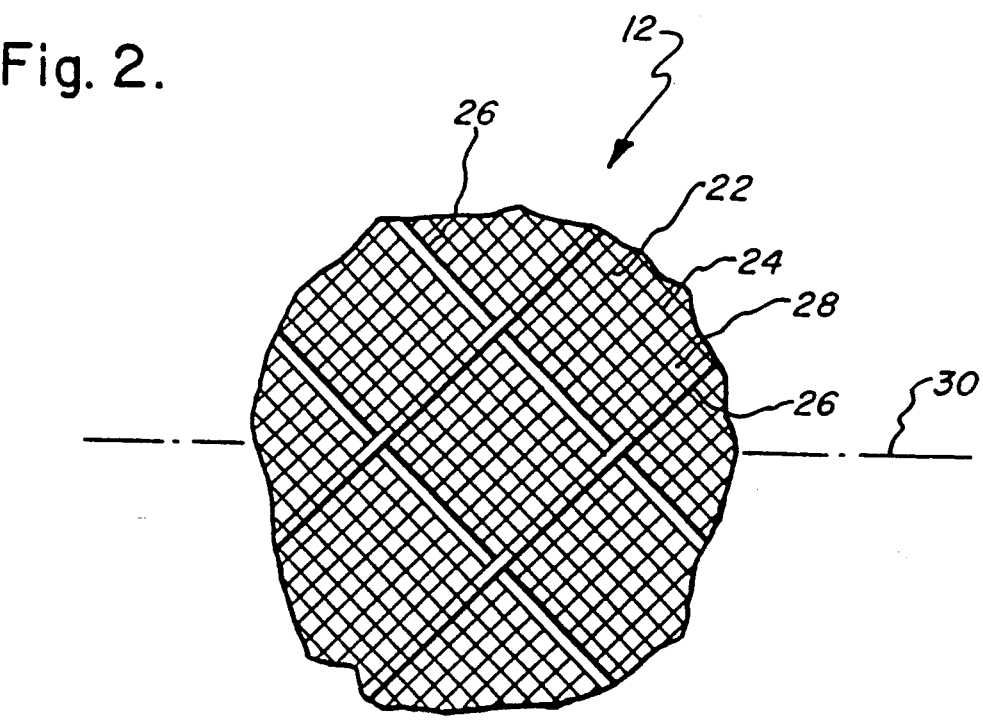
FIG. 2 is a schematic view of a portion of the case for the rocket motor of FIG. 1 illustrating plies of fibrous material and memory metal members in the composite material thereof.

The case 12 may be filament wound on a mandrel in accordance with principles commonly to those of orinary skill in the art to which this invention pertains and includes a plurality of plies of fibrous material strands impregnated with a matrix material 28. For example, as illustrated in FIG. 2, a first ply of strands 22 of fibrous material may be applied to extend at an angle of perphaps +54.74 degrees relative to the longitudinal plane 30 of the rocket motor, and a second ply of fibrous material strands 24 may be applied to extend at an opposed angle of perphaps −54.74 degrees relative to the longitudinal plane 30. The number of layers (ply 22 plus ply 24) of fibrous material will vary depending on the particular rocket motor requirements and may be selected using principles commonly known to those of ordinary skill in the art to which this invention pertains. The plies 22 and 24 may comprise any suitable fibrous material such as carbon, aramid, or glass which is impregnated with a suitable matrix material 28 such as an epoxy resin.

The ambient temperature range for storage of the rocket motor 10 may perphaps be between about −54° and 70° Centigrade. The propellant material 18 may perphaps have an auto-ignition temperature, i.e., the temperature at which the propellant will automatically ignite, of perhaps 120° Centigrade. In the event of a fire in the location where the rocket motor 10 is being stored, the temperature may reach the auto-ignition temperature such that the propellant material ignites. If the case 12 is not burst or vented when the propellant material ignites, the only means of escape of the propellant gases is through the nozzle 16 with the results that the rocket motor 10 may catastrophically become propulsive. In order to prevent such a catastrophic propulsion of the rocket motor 10 from occurring in the event of a fire or the like, the case 12 is caused to burst so as to provide openings or vents therein to handle the outflow of combustion gases so that propulsive pressure rise is prevented if the propellant material 18 were to subsequently auto-ignite. In order to prevent the rocket motor from unnecessarily being damaged, the temperature at which the vents are provided should be at a temperature substantially above the ambient temperature range but substantially below the propellant auto-ignition temperature, for example, a temperature of perphaps 90° Centigrade for the previously discussed auto-ignition and ambient temperature range. In order to provide such venting, in accordance with the present invention a plurality of elongate memory metal members 26 are interleaved between at least one pair of plies 22 and 24. Some of the memory metal members may be disposed transverse to some of the strands 22 or 24, and others of the memory metal members 26 may generally be parallel therewith as illustrated in FIG. 2.

As used in this specification and the claims, a "memory metal" is meant to refer to a metal or alloy which at or below a particular temperature may be deformed from an original configuration and which retains this deformed configuration until it is heated to a point above a particular temperature at which temperature it recovers towards its original configuration. Thus, it may, for example, straighten, lengthen, or become shorter. Such a metal or alloy exhibits a so-called martensitic transformation from a low temperature form to a high temperature form, and it is this transformation that produces the memory effect. This transformation occurs over a small temperature range, and, because of hysteresis the position of the temperature range usually varies depending on whether the alloy is being heated or cooled. Thus, a straight wire made of a memory metal at a temperature above this transformation temperature and coiled at ambient temperature below this transformation temperature spontaneously reassumes a straight shape when heated to above the transformation temperature. For the purposes of this specification and the claims, "transformation temperature" is defined as that temperature above which a memory metal member changes shape. Examples of such memory metals include nickel-titanium binary alloys containing 52 to 56 percent by weight of nickel and certain gold-cadmium, cadmium silver-gold, and indium-thallium alloys. The transformation temperature for typical memory metals can be controlled from about −200° Centigrade to about +170° Centigrade with suitable alloying in accordance with the principles commonly known to those of ordinary skill in the art to which this invention pertains. Various examples of such memory metals may be found in U.S. Pat. Nos. 3,174,851; 3,540,372; 3,802,930; 4,144,057; 4,149,911; 4,565,589; 4,639,802; 4,740,253; 4,765,033; and 4,808,246, all of which patents are incorporated herein by reference. As discussed in U.S. Pat. No. 4,740,253 to Simpson et al, memory have been used, for example, in pipe couplings, electrical connectors, switches, and the like.

The memory metal members 26 may have any suitable cross-sectional shape such as that of wires or shim stock. They may be selected in accordance with principles commonly known to those of ordinary skill in the art to which this invention pertains to be sized and have a composition and spacing within the composite to apply sufficient stress while straightening or otherwise changing shape to provide the desired venting of the case. For example, the memory metal members 26 may comprise wires having a diameter of about 0.01 inch and composed of a nickel-titanium alloy the percentages of which can be determined using principles commonly known to those of ordinary skill in the art to which this invention pertains to achieve the desired transformation temperature. They may be wound into the case 12 to be spaced apart a distance of perhaps 1 inch. Wires 26 may have a transformation temperature of perhaps 90° Centigrade at which the wires may exert a stress of up to perhaps 60 ksi (kilopounds per square inch) and a strain of up to perhaps 10 percent on the composite material of the case as they straighten to break strands of the fibrous material and/or break through the matrix material and thus burst the case to provide venting for the escape of propellant gases.

Wires 26 may be produced in straight form (or a form which is substantially straighter than their curved form when in the composite at a temperature below the transformation temperature) at a temperature above the transformation temperature. They may then be cooled to ambient temperature below the transformation temperature and shaped into a curved form for insertion in the composite material of the case. Their shape is then maintained as long as the case temperature remains below the transformation temperature, i.e., during normal storage and operation of the rocket motor. Upon heating of the case 12, by unexpected fire or the like, to a temperature above the transformation temperature which is substantially above the ambient temperature range but which is substantially less than the propellant auto-ignition temperature, the wires 26 will spontaneously straighten to their original shape causing the case 12 to burst and thereby provide venting means therein for the propellant gases.

While venting of a rocket motor case has been described herein, it should be understood that the present invention may also be used to vent the cases of other types of gas generators to alleviate the possibility of a catastrophic burst thereof in the event of a fire or the like.

It is to be understood that the invention is by no means limited to the specific embodiments which have been illustrated and described herein and that various modifications thereof may indeed be made which come within the scope of the present invention as defined by the appended claims.

What is claimed is:

1. A gas generator comprising a case composed of a plurality of plies of fibrous material strands impregnated with a matrix material, gas generant material disposed within said case, means for igniting said gas generant material, and a plurality of elongate memory metal members interleaved between said plies, said gas generant material characterized by automatically igniting at a predetermined temperature which is substantially higher than the ambient temperature range to which the gas generator is normally subjected, said memory metal members having a transformation temperature which is substantially higher than said ambient temperature range and which is substantially lower than said predetermined temperature and characterized by a change in shape when heated to a temperature above said transformation temperature.

2. A gas generator according to claim 1 wherein said memory metal members have a curve shape when at a temperature below said transformation temperature and which are characterized by straightening when heated to a temperature above said transformation temperature.

3. A rocket motor comprising a case composed of a plurality of plies of fibrous material strands impregnated with a matrix material, solid propellant material disposed within said case, means for igniting said solid propellant material, nozzle means attached to said case, and a plurality of elongate memory metal members interleaved between said plies, said solid propellant material characterized by automatically igniting at a predetermined temperature which is substantially higher than the ambient temperature range to which the rocket motor is normally subjected, said memory metal members having a transformation temperature which is substantially higher than said ambient temperature range and which is substantially lower than said predetermined temperature and characterized by a change in shape when heated to a temperature above said transformation temperature.

4. A rocket motor comprising a case composed of a plurality of plies of fibrous material strands impregnated with a matrix material, solid propellant material disposed within said case, means for igniting said solid propellant material, nozzle means attached to said case, and a plurality of elongate memory metal members interleaved between said plies, said solid propellant material characterized by automatically igniting at a predetermined temperature which is substantially higher than the ambient temperature range to which the rocket motor is normally subjected, said memory metal members having a transformation temperature which is substantially higher than said ambient temperature range and which is substantially lower than said predetermined temperature, said memory metal members having a curved shape when at a temperature below said transformation temperature and characterized by straightening when heated to a temperature above said transformation temperature.

* * * * *